US008625766B2

(12) United States Patent
Brown et al.

(10) Patent No.: US 8,625,766 B2
(45) Date of Patent: Jan. 7, 2014

(54) PRESENCE AND/OR CAPABILITY BASED COMMUNICATION

(75) Inventors: David Brown, Abbotsley (GB); Ajit B. Pendse, Durham, NC (US); Michael James Ward, Mebane, NC (US)

(73) Assignee: Geo Semiconductor Inc., Santa Clara, CA (US)

( * ) Notice: Subject to any disclaimer, the term of this patent is extended or adjusted under 35 U.S.C. 154(b) by 1677 days.

(21) Appl. No.: 11/452,118

(22) Filed: Jun. 12, 2006

(65) Prior Publication Data

US 2007/0286378 A1    Dec. 13, 2007

(51) Int. Cl.
  *H04M 3/42*   (2006.01)
  *H04M 3/493*  (2006.01)
  *H04W 24/00*  (2009.01)

(52) U.S. Cl.
  USPC .............. 379/201.1; 379/201.01; 379/201.06; 379/201.07; 455/414.1; 455/414.2; 455/456.1

(58) Field of Classification Search
  USPC ............. 379/202.01, 201.06, 201.07, 201.08, 379/201.09, 201.1; 455/41.1, 404.2, 414.1, 455/414.2, 456.1, 456.2
  See application file for complete search history.

(56) References Cited

U.S. PATENT DOCUMENTS

| | | | |
|---|---|---|---|
| 5,371,534 A * | 12/1994 | Dagdeviren et al. | 348/14.01 |
| 6,381,457 B1 * | 4/2002 | Carlsson et al. | 455/435.2 |
| 6,493,550 B1 * | 12/2002 | Raith | 455/422.1 |
| 6,857,021 B1 * | 2/2005 | Schuster et al. | 709/227 |
| 7,174,176 B1 * | 2/2007 | Liu | 455/462 |
| 7,274,909 B2 * | 9/2007 | Perttila et al. | 455/41.2 |
| 7,330,112 B1 * | 2/2008 | Emigh et al. | 340/539.13 |
| 7,715,835 B1 * | 5/2010 | Karnik | 455/420 |
| 7,877,082 B2 * | 1/2011 | Eagle et al. | 455/414.1 |
| 2001/0024474 A1 * | 9/2001 | Rakib et al. | 375/259 |
| 2004/0087273 A1 * | 5/2004 | Perttila et al. | 455/41.2 |
| 2004/0142709 A1 * | 7/2004 | Coskun et al. | 455/466 |
| 2004/0176074 A1 * | 9/2004 | Radpour | 455/414.1 |
| 2005/0034147 A1 * | 2/2005 | Best et al. | 725/10 |
| 2006/0019679 A1 * | 1/2006 | Rappaport et al. | 455/456.5 |
| 2006/0142030 A1 * | 6/2006 | Coskun et al. | 455/466 |
| 2006/0172753 A1 * | 8/2006 | Sung et al. | 455/518 |
| 2006/0183426 A1 * | 8/2006 | Graves et al. | 455/63.1 |
| 2006/0234631 A1 * | 10/2006 | Dieguez | 455/41.2 |
| 2006/0288095 A1 * | 12/2006 | Torok et al. | 709/223 |
| 2007/0032240 A1 * | 2/2007 | Finnegan et al. | 455/445 |
| 2007/0042791 A1 * | 2/2007 | Walter | 455/461 |
| 2007/0097879 A1 * | 5/2007 | Bleckert et al. | 370/254 |
| 2007/0167136 A1 * | 7/2007 | Groth | 455/41.2 |
| 2008/0288355 A1 * | 11/2008 | Rosen | 705/14 |

OTHER PUBLICATIONS

International Search Report dated Dec. 3, 2007 for PCT/US07/70414 (2 pages).
Writen Opinion of International Searching Authority dated Dec. 3, 2007 for PCT/US07/70414 (8 pages).

* cited by examiner

*Primary Examiner* — Khai N Nguyen
(74) *Attorney, Agent, or Firm* — Sughrue Mion, PLLC

(57) ABSTRACT

Methods and apparatuses for detecting current presence and/or determining capabilities of subscribers, and enabling users of communication devices to initiate communication sessions with other communication devices of selected ones of the subscribers, in selected manners, based at least in part on current presence and/or capabilities of the other subscribers, are described herein. In various embodiments, the initiating is performed without or substantially without further input from an initiating user on the other communication device.

34 Claims, 5 Drawing Sheets

102

PRESENCE AND/OR CAPABILITY BASED COMMUNICATION

TECHNICAL FIELD

Embodiments of the present invention relate to the fields of communications, in particular, to methods and apparatuses associated with presence and/or capability based telephony.

BACKGROUND

Advances in integrated circuit, processor, telecommunication, networking and other related technologies have led to the proliferation of a wide variety of communication devices having a wide range of communication capabilities. Today, it is not uncommon for conference room and/or office communication devices to be capable of video conferencing, office desk sets to be capable of wideband Voice Over IP (VOIP) telephony, and mobile communication devices to be capable of cellular communication like GSM, 3G and/or wireless communication like WiFi (802.11x) and WiMax. And yet, it is still not uncommon for a user to employ a traditional (cordless) handset, when a user is home. Thus, today, a user typically has at least two options in initiating a communication session with another user, the other user's mobile communication handset, and the communication device located at the current venue the user is located, which may be the user's office, home, and so forth. However, under the prior art, the initiating user typically has no information as to the current presence and capability of the other user. As a result, communication often may not be conducted over the most optimal or capable devices.

{GSM=Global System for Mobile Communication; 3G=3$^{rd}$ Generation; and WiMax=Worldwide Interoperable Microwave Access.}

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for presence and/or capability based communications.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
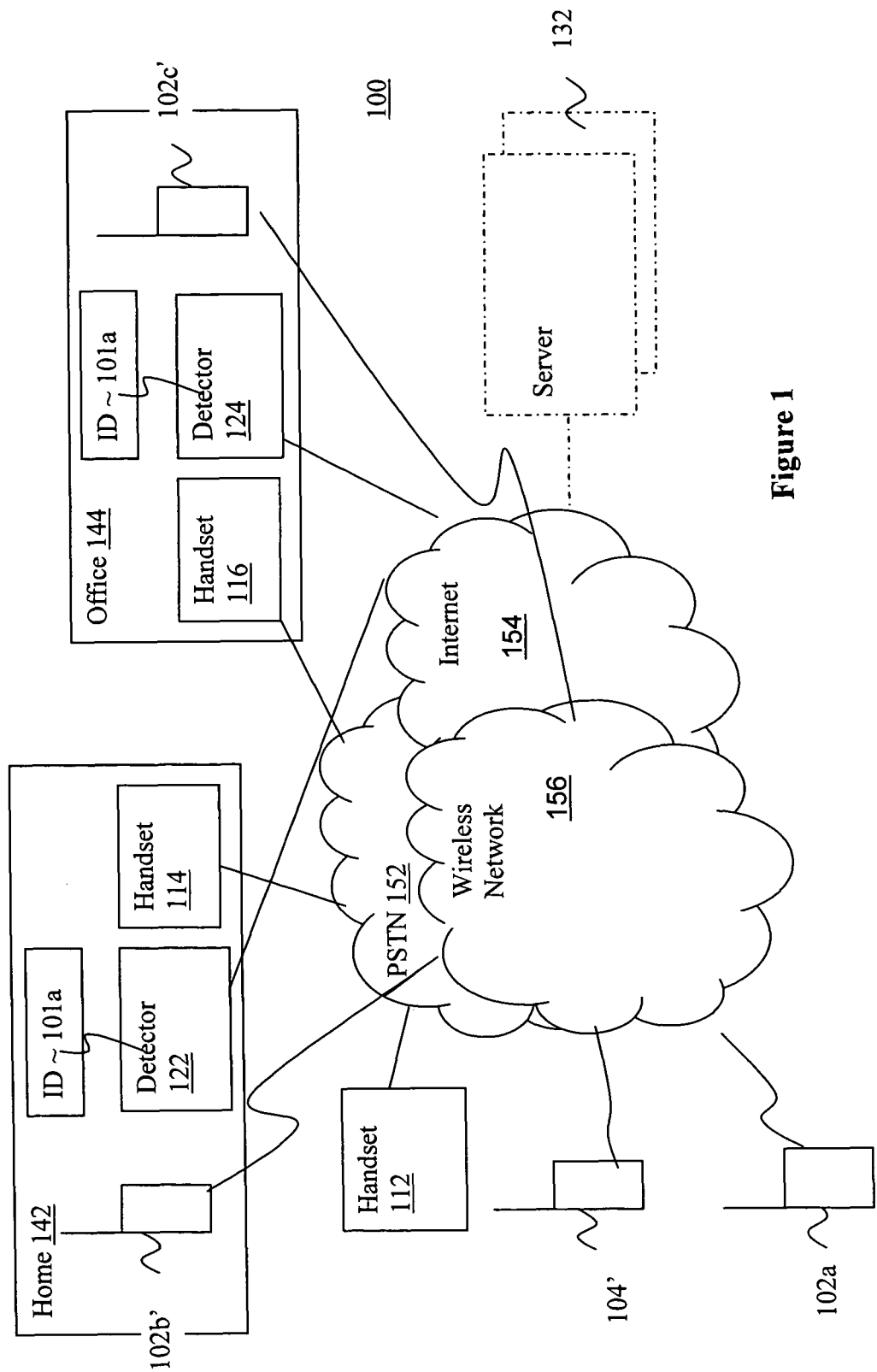
FIG. 1 illustrates an overview of the present invention, in accordance with various embodiments.

FIG. 1 illustrates an overview of the present invention, in accordance with various embodiments. As illustrated, for the example embodiments, system 100 includes identification devices 101*, mobile communication device 102* and 104, conventional handset 112-116, detectors 122-124, and server 132. Identification devices 101$a$-101$b$ and mobile communication devices 102$a$-102$c$ represent an identification device 101 and a mobile communication 102 moving to the various locations with its user, respectively. The various exemplary locations include but are not limited to the user's home 142 and the user's office 144. The various elements 102, 104, 112-116, 122-124 and 132 are communicatively coupled to each other via PSTN 152, Internet 154, and 154. Elements 101-102 and 122-124 are further communicatively coupled to each other via Personal and/or Local Area Networks located at the various venues.

As will be described in more detail, identification devices 101, mobile communication devices 102 and 104, conventional handset 112-116, detectors 122-124, and server 132 are incorporated with the teachings of the present invention, enabling a user to be able to initiate a communication session with another subscriber of communication services (hereinafter, simply subscriber) based at least in part on the current presence and/or communication capability (hereinafter, simply capability) of the other subscriber. As a result, communication session may be placed to the proper communication device of the other subscriber, without requiring the other subscriber to actively manage communication forwarding. In various embodiments, the communication session may be automatically established with the currently most capable communication device or with the currently preferred communication device of the other subscriber for the initiating user without requiring or substantially without requiring the initiating user in the selection of the currently most capable or preferred communication device, thereby enhancing the user experience of the initiating user and/or the other subscriber.

Elements 101, 102-104, 122-124, 122-126 and 132, including the manner they cooperate with each other will be described substantially in turn. Before doing so, it should noted that in alternate embodiments, the present invention may be practiced without some of the elements, and/or with additional other elements. For example, as will be described in more detail below, in various embodiments, the present invention may be practiced without identification devices 101 and/or server 132.

Continuing to refer to FIG. 1, in various embodiments, detectors 122-124 are equipped to detect the presence and/or determine the capabilities of the subscribers, and provide the detected presence and/or determined capability data to other subscribers, to enable the other subscribers to initiate communications with the subscribers, based at least in part on the current presence and/or capabilities of the subscribers, as earlier described.

In various embodiments, detectors 122-124 are equipped to detect presence of subscribers through detection, receipt of identifications of the subscribers and/or identifications of devices known to be associated with the subscribers. In various embodiments, detectors 122-124 receive the identifications of the subscribers from identification devices 101. Examples of identification devices include but are not limited RFIDs, magnetic cards, and so forth. In other words, detectors 122-124 may be equipped to read a RFID, a magnetic card, and so forth.

In other embodiments, detectors 122-124 are alternatively or additionally equipped to detect presence of subscribers through detection, receipt of identifications of the subscribers and/or the mobile communications devices 102 known to be associated with the subscribers, through mobile communication devices 102. Detectors 122-124 may be pre-provided with the associated communication devices of the subscribers, or may be equipped to dynamically retrieve the information from one or more communication servers (not shown). Except for the incorporated teachings of the present invention, mobile communication devices 102 may be any mobile communication devices known in the art, including but not limited to mobile communication devices equipped for CDMA, GSM, GPRS, 3G, WiFi and/or WiMax communication.

In various embodiments, detectors 122-124 may determine the current capabilities of the various subscribers by inferring the current capabilities of the various subscribers based on their current presence, i.e. whether the subscribers are located in a public venue, in the office or at home. For example, detectors 122-124 may infer the communication capabilities of the subscribers to be cellular when the subscriber's presence is unknown or in a public venue, VOIP when the subscribers are in the office, and traditional POTS when the subscribers are at home. Detectors 122-124 may be pre-provided with the communication capabilities of the subscribers at the various venues, or dynamically retrieve the information from one or more communication servers (not shown). (POTS=Plain Old Telephone Service.)

In various embodiments, e.g. embodiments where detectors 122-124 receive the identifications of the subscribers from the mobile communication devices 102, detectors may receive the current communication capabilities of the subscribers from the mobile communication devices 102 instead.

In various embodiments, communications between detectors 122-124 and identification devices 103 and/or mobile communication devices 102 may be conducted over a WPAN (Wireless Personal Area Network), in accordance with an appropriate communicate protocol, such as Bluetooth™. The communications may be performed in accordance with either a pull or push model. That is, detectors 122-124 may be equipped to transmit discovery packets from time to time to enable mobile communication devices 102 entering their domains to discern their presence, and provide the identification and/or capability information in response to the requests of detectors 122-124 (pull model). In other embodiments, detectors 122-124 may be equipped to respond to the discovery packets of the mobile communication devices 102 and accept the identification and/or capability information transmitted by mobile communication devices 102 on detection of being proximally situated with detectors 122-124 (push model).

In various embodiments, detectors 122-124 are equipped to distribute the collected presence and/or capability data collected for the various subscribers. Detectors 122-124 may distribute the collected data directly to the subscribers (more specifically, communication devices associated with the subscribers) or indirectly through other detectors 122-124 and/or server 132. In various embodiments, detectors 122-124 may alternatively or additionally distribute the collected data to communication service providers (not shown), e.g. providers of cellular and/or conventional telephone services.

Detectors 122-124 may report the collected data to the subscribers, other detectors 122-124, server 132, or communication service providers in accordance with a push and/or pull model. For the push model, detectors 122-124 may report the collected data to the applicable subscriber, other detectors 122-124, server 132, or communication service providers in real time, as the data are collected, or in batch, periodically, for a group of subscribers at a time. For the pull model, detectors 122-124 may report the collected data to the subscribers, other detectors 122-124, server 132 or communication service providers in response to the periodic polling by the individual subscriber, server 132 and communication provider.

Likewise, for the embodiments, where the collected data are distributed to other detectors 122-124 through server 132, the distribution from server 132 to the other detectors 122-124 may be through a push and/or pull model.

Communication among the detectors 122-124, between the detectors 122-124 and the subscriber devices 102-104 and 112-116, server 132 and communication service providers, and between the subscriber devices 102-104 and 112-116 and server 132 may be over a Wide Area Network (WAN), in accordance with any one of a number of communication protocols, such as TCP/IP (TCP/IP=Transmission Control Protocol/Internet Protocol.). Communications among the detectors 122-124, between the detectors 122-124 and the subscriber devices 102-104 and 112-116 may be peer-to-peer connections.

As a result, with the presence and/or capability data of various subscribers of interest available at either the mobile communication devices 102-104, handsets 112-116, detectors 122-124, server 132 and/or communication service providers, a user of a selected one of mobile communication devices 102-104 and handsets 112-116 may initiate a communication session with another subscriber, based at least in part on the current presence and/or capability of the other subscriber, as desired, with either the selected one of mobile communication devices 102-104 or the communication service provider automatically resolving the appropriate target communication device for the communication session, to be described more fully below. In various embodiments, the mobile communication devices 102-104 or the communication service provider may allow the user to override its selection of the target communication device of the other subscriber.

Except for the teachings incorporated, and the manner they are employed, mobile communication devices 104 and handsets 112-116 may be any one of these devices known in the art. Similarly, except for the manner they are employed to practice the present invention, PSTN 152, Internet 154 and Wireless Network 156 represent a broad range of these elements known in the art.

While for ease of understanding, only a handful of mobile communication devices 102-104 and handsets 112-116 are illustrated, the present invention is not so limited and may be practiced with any number of mobile communication devices 102-104 and handsets 112-116 subject only the communication network and service providers' capacity. Similarly, while only one server 132 is illustrated, when employed, server 132 may be one or more virtual and/or physical servers. The plurality of virtual servers may be instantiated on one or more single or multiple core, and/or single or multiple processors computing devices.

Additionally, in various embodiments, detectors 122-124 may be integrated with various appliances. For example, detectors 122-124 may be integrated with a wireless networking access point. Additionally, detector 122 (at home) may be integrated with a set-top box, a base station of a cordless phone, a media control center (such as a desktop equipped with MS' Media Edition); detector 124 (at office) may be integrated with a desktop handset, and so forth.

Figure 2:
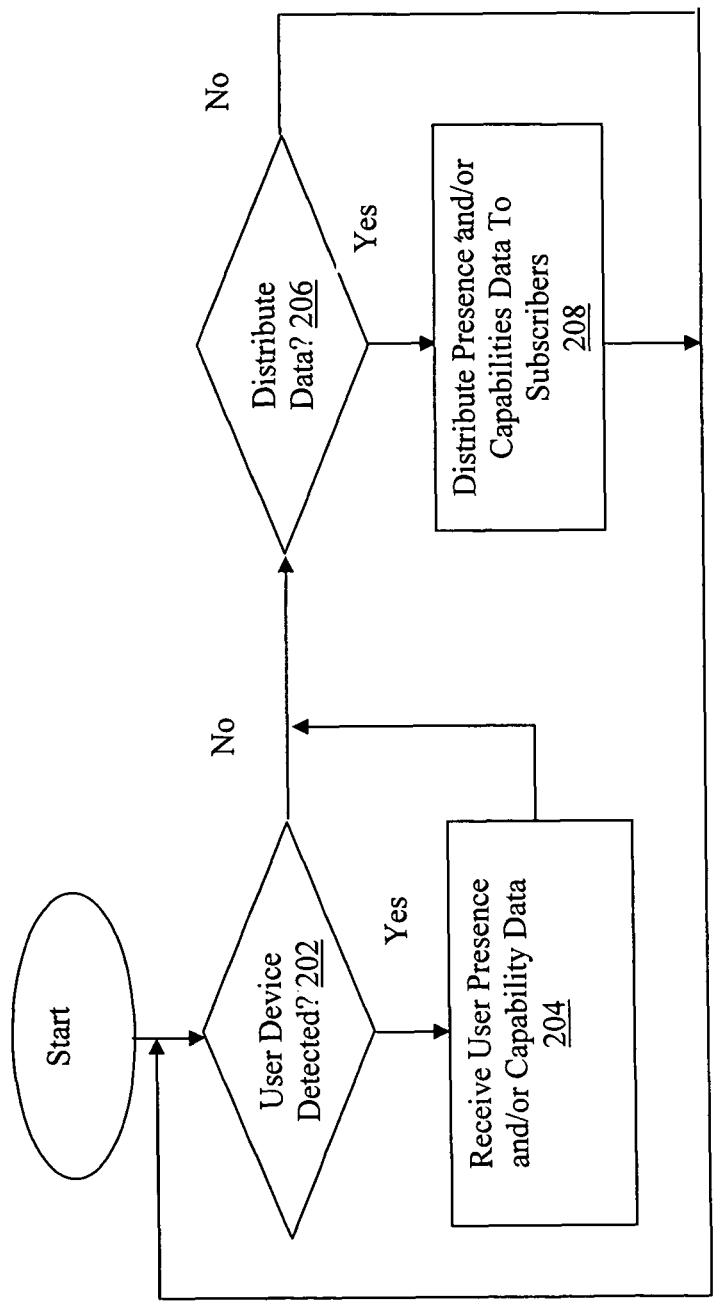
FIG. 2 illustrates a flow chart view of selected operations performed by a detector of FIG. 1, in accordance with various embodiments.

FIG. 2 illustrates a flow chart view of selected operations performed by a detector 122/124 of FIG. 1, in accordance with various embodiments. As illustrated, for the embodiments, the operation may begin at block 202 where a detector may detect for the presence of an identification and/or mobile communication device. As described earlier, in various embodiments, the detector may detect the presence of an identification device by sensing and reading the identification device. For the detection of a mobile communication device, the detector may detect its by periodically sending out discovery packets and detecting responsive packets from the mobile communication device, or in other embodiments, the detector may detect the presence of the mobile communication device by detecting the discovery packets transmitted by the mobile communication device.

On detection, at block 204, the detector proceeds to receive the identification and/or capability data. As described earlier, the detector may receive the identification and/or capability data via a push and/or pull model. Additionally, the detector may receive only the identification data, and infer the capability based on the received identification data. The detector may be pre-provided with the associated capability data or access and retrieve the capability data from a remote server.

From block 202 or block 204, operation may proceed to block 206 where a detector may determine whether it is time to distribute the presence and/or capability data collected. As described earlier, the distribution may be in real time, as the data are collected, or in batch, periodically, for a group of subscribers. If it is not time to distribute the collected data yet, operation may continue at block 202 again. For real time embodiments, the present invention may be practiced without this determination operation.

In any event, on "determining" that it is time to distribute the collected data, operation proceeds to block 208, where the detector proceeds to distribute the collected presence and/or capability data. As described earlier, the distribution may be to various subscriber devices, to other detectors, to one or more central servers, and to one or more communication service providers, directly or indirectly. The distribution may be effectuated to individual connections or through multi-cast transmissions. The connections may be over a WAN, and may be client-server or peer-to-peer connections.

Note that for the embodiments where the presence and/or capability data are distributed indirectly to the subscribers, operations similar to operations 206-208 are practiced by the various "relay" detectors 122-124 and sever 132 to in turn provide the distributed data to the subscriber devices (in a push and/or pull manner).

Figure 3:
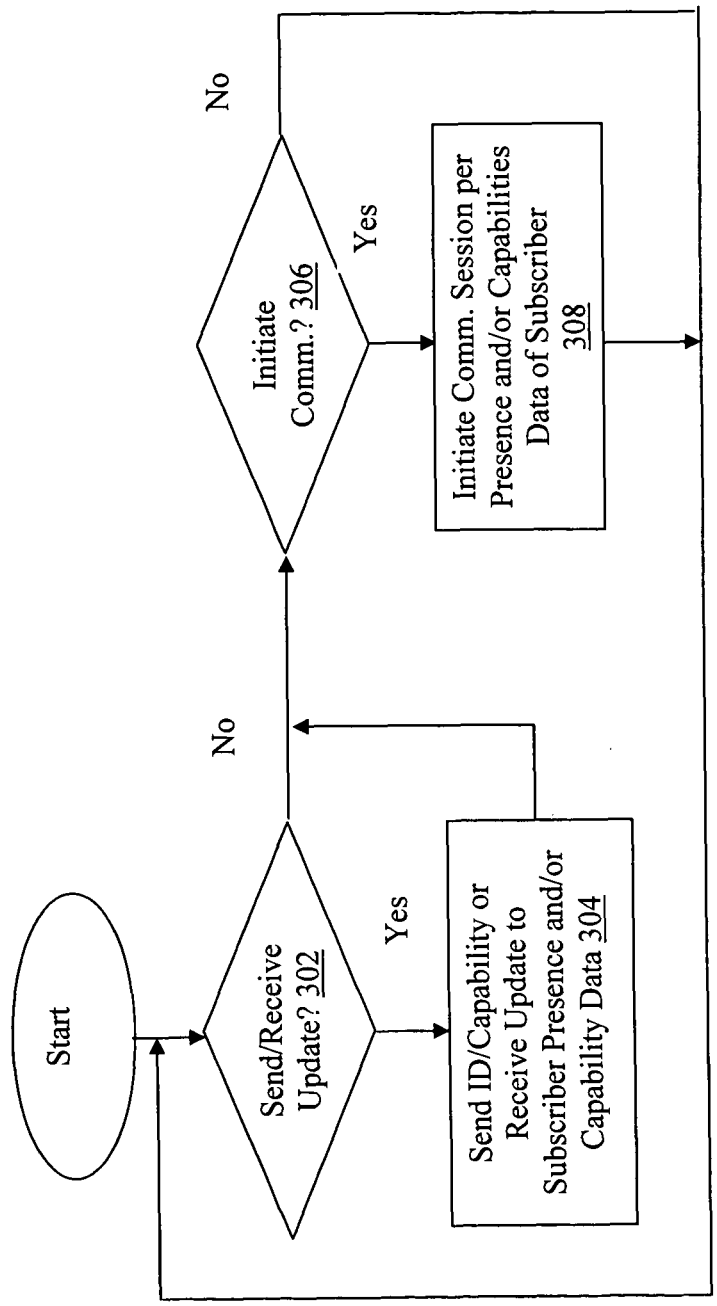
FIG. 3 illustrates a flow chart view of selected operations performed by a mobile communication device of FIG. 1, in accordance with various embodiments.

FIG. 3 illustrates a flow chart view of selected operations performed by a mobile communication device 102/104 of FIG. 1, in accordance with various embodiments. For these embodiments, the mobile communication device may be equipped to provide the identification of the user or the device itself, and/or communication capability of the device.

As illustrated, for the embodiments, the operation may begin at block 302 where a mobile communication device of the present invention determines whether it is to provide its identification and/or capability data to a proximally located detector, and/or receive presence and/or capability data of other subscribers of interest from a proximally located detector and/or server.

As described earlier, in various embodiments, the mobile communication device may detect the presence of the proximally located detector by periodically sending out discovery packets and detecting responsive packets from the proximally located detector, or in other embodiments, the mobile communication device may detect the presence of the proximally located detector by detecting the discovery packets transmitted by the proximally located detector.

On determining it is time to provide identification and/or capability data, the operation proceeds to block 304, where the mobile communication device provides its identification and/or capability data to a proximally located detector. Similarly, on determining it is time to receive identification and/or capability data of other subscribers of interest, the operation proceeds to block 304, where the mobile communication device receive the identification and/or capability data of other subscribers of interest from a proximally or remotely located detector and/or server.

As described earlier, the communication with a proximally located detector may be conducted over a WPAN, whereas communication with remotely located detectors and/or server, the communication may be conducted over a WAN, via a client-server and/or peer-to-peer connection.

From block 302 or 304, operation may proceed to block 306 where a determination is made whether the mobile communication device is to initiate a communication session with another subscriber of interest. If the mobile communication device is not to initiate a communication session with another subscriber of interest, operation may continue at block 302 as earlier described.

On the other hand, if the mobile communication device is to initiate a communication session with another subscriber of interest, for the embodiments, the mobile communication device determines the appropriate communication device associated with the subscriber of interest to establish the communication session, based at least in part on the current presence and/or capability data of the subscriber, and proceeds to establish the communication session accordingly. For example, the mobile communication device may call the other subscriber's mobile communication device if the other subscriber's presence and capability is unknown, call the other subscriber's VOIP desk set if the other subscriber is at the office or at a venue with a VOIP desk set, or call the other subscriber's conventional POTS handset if the other subscriber is at home or at a venue with only conventional POTS.

As described earlier, the communication session to the appropriate communication device may be established automatically, or allow the user to override the selection. Additionally, the selection of the appropriate communication device may be performed by the communication service provider. In other words, the mobile communication device may merely provide the identification of the subscriber of interest to the communication service provider, and request a communication session be established with the subscriber. The communication service provider looks up the current presence and/or capability data of the target subscriber, and establishes the communication session accordingly.

Note that the logic for practicing the above described operations (with or without subtracting the ability to provide presence and/or capability data) may also be provided to handsets 112-116 to enable the handsets to facilitate presence and/or capability based communication for a user, as mobile communication devices 102-104.

Figure 4:
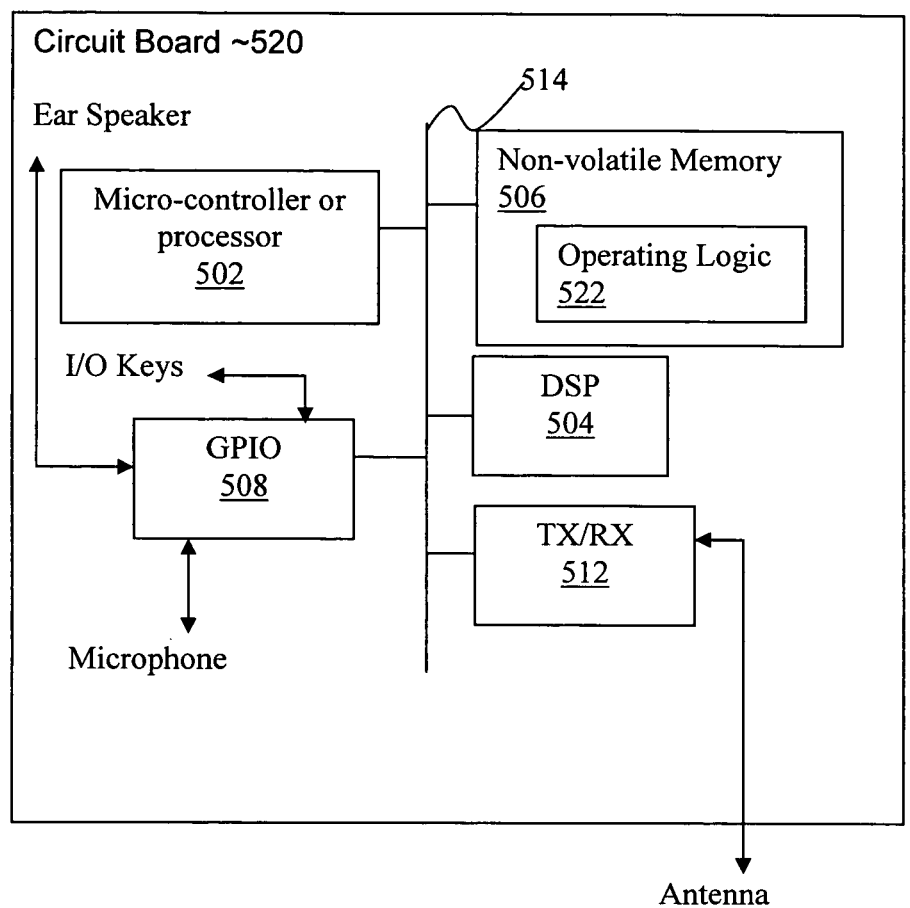
FIG. 4 illustrates an architectural view of an example mobile communication device suitable for practicing the present invention, in accordance with various embodiments.

FIG. 4 illustrates an architectural view of an example mobile communication device suitable for practicing the present invention, in accordance with various embodiments. As illustrated, wireless device 500 includes elements found in conventional mobile client devices such as micro-controller/processor 502, digital signal processor (DSP) 504, non-volatile memory 506, one or more transmitters/receivers (TX/RX) 512 (also known as transceiver(s)), and general-purpose input/output (GPIO) 508. Memory 506 includes programming instructions implementing various mobile telephony services, including the logic in support the various aspects of the present invention (collectively referred to as operatic logic 522).

Except for the teachings of the present invention, these elements perform their conventional functions known in the art. In particular, TX/RX(s) 512 may support one or more of any of the known signaling protocols, including, but not limited to, code division multiple access (CDMA), time division multiple access (TDMA), global system for mobile communications (GSM), general radio packet services (GPRS), cellular digital packet data (CDPD), 3G, and so forth. Additionally, TX/RX(s) 512 may also support one or more wireless communication protocols including, but not limited to, infrared, Bluetooth, WiFi, WiMax, and so forth.

Figure 5:
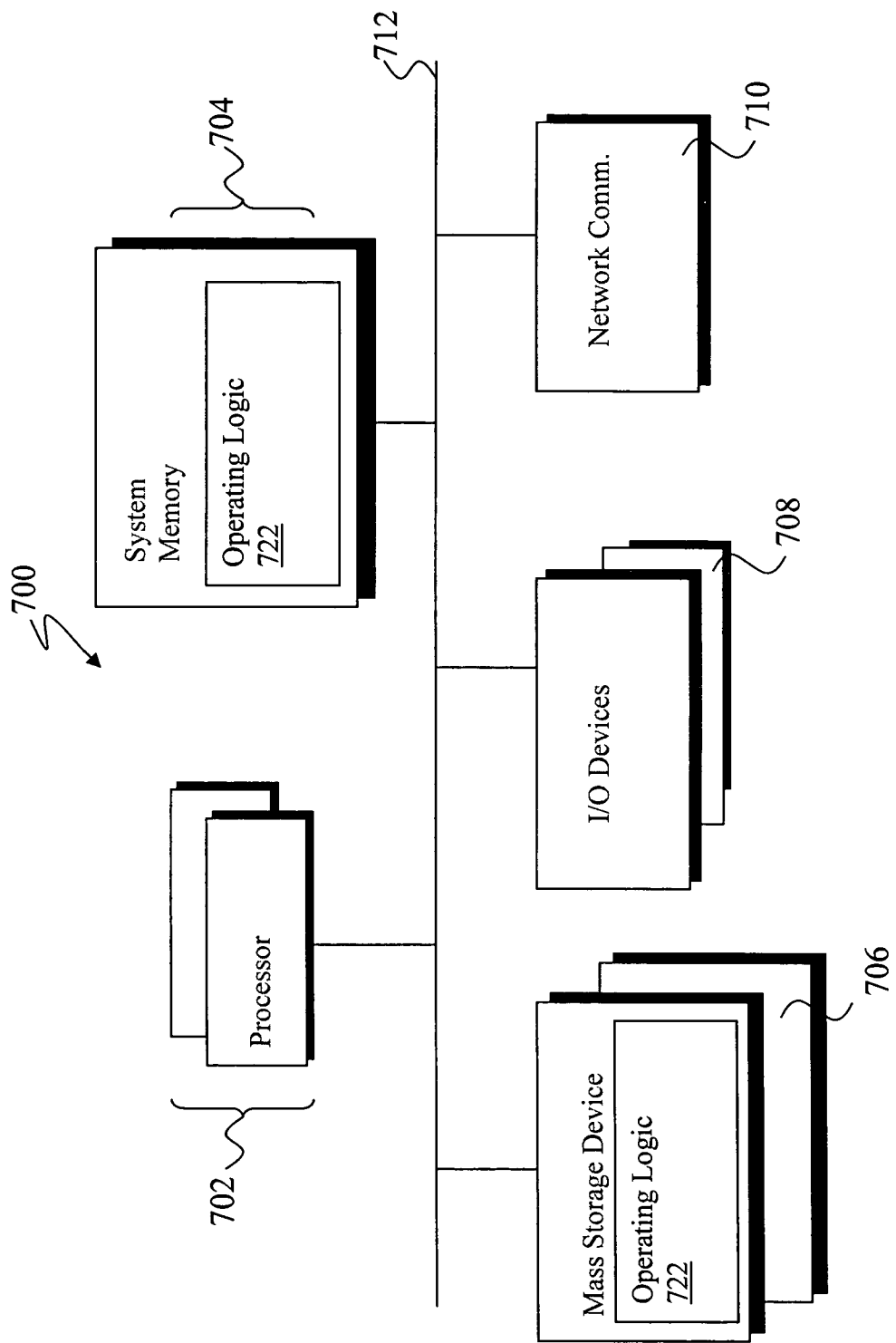
FIG. 5 illustrates an example computer system suitable for use as a detector and/or server, in accordance with various embodiments of the present invention.

FIG. 5 illustrates an example computer system suitable for use as a detector or server, in accordance with various embodiments of the present invention. As shown, computing system 700 includes one or more processors 702, and system memory 704. Additionally, computing system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown).

Each of these elements performs its conventional functions known in the art. In particular, system memory 704 and mass storage 706 may be employed to store a working copy and a permanent copy of the programming instructions implementing the earlier described logic of detectors and/or server, herein collectively denoted as instructions 722. The various components may be implemented as assembler instructions supported by processor(s) 702 or high level languages, such as C, that can be compiled into such instructions.

The permanent copy of the programming instructions may be placed into permanent storage 706 in the factory, or in the field, through, for example, a distribution medium (not shown), such as a compact disc (CD), or through communication interface 710 (from a distribution server (not shown)).

The constitution of these elements 702-712 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
receiving presence and capability data by a communication device, of subscribers of interest to a user of the communication device, the presence and capability data correspondingly indicating current presence and capability of the subscribers of interest;
receiving a request by the communication device, from the user to initiate a communication session with a selected one of the subscribers of interest;
initiating the communication session, by the communication device, with another communication device associated with the selected one of the subscribers of interest in a selected manner, based at least in part on the presence and capability data of the selected one of the subscribers of interest; and
wherein the subscribers of interest are associated with a presence and capability detector that is physically placed at a location and used to monitor the presence and capability of the subscribers of interest at this location; and
wherein the presence and capability detector communicates with identification devices physically proximate to the subscribers of interest via a Personal and/or Local Area Network that is located at this location and independent from the selected manner associated with the communication session.

2. The method of claim 1, wherein said initiating comprises initiating a call by the communication device to a preferred communication device of the selected one of the subscribers of interest, if the presence and capability data associated with the selected one of the subscribers of interest indicates presence and capability unknown or uncertain for the selected one of the subscribers of interest.

3. The method of claim 1, wherein said initiating comprises initiating a call by the communication device to a communication device of the selected one of the subscribers of interest, located at a home, an office, or a conference room of the selected one of the subscribers of interest, if the presence data associated with the selected one of the subscribers of interest indicates presence at the home, the office or the conference room of the selected one of the subscribers of interest, respectively.

4. The method of claim 1, wherein said initiating comprises initiating a call by the communication device to a communication device of the selected one of the subscribers of interest, corresponding to the capability data associated with the selected one of the subscribers of interest.

5. The method of claim 1, wherein said initiating comprises requesting a communication service provider to establish the communication session with the subscriber of interest, with the communication service provider establishing the communication session to a communication device of the selected one of the subscribers of interest, based at least in part on the presence and capability data associated with the selected one of the subscribers of interest.

6. The method of claim 1, wherein said initiating is performed in response to said receiving of a request to initiate a communication session, without or substantially without receiving further input from the initiating user about the other communication device.

7. The method of claim 1, wherein said receiving of presence and capability data comprises receiving by the communication device, the presence and capability data from a proximally disposed presence and capability detector, or from a remotely disposed presence and capability data server.

8. The method of claim 1, further comprising transmitting by the communication device, an identification of the user or the communication device, and capability of the communication device to a proximally located presence and capability detector.

9. The method of claim 8, wherein at least one of said transmitting or receiving is performed in accordance with either a personal network communication protocol or a local area network communication protocol.

10. The method of claim 1, further comprising determining by the communication device, a current presence and capability of the selected one of the subscribers of interest, based at least in part on the received presence and capability data of the subscribers of interest.

11. A mobile communication device comprising:
a transmit and receive module that transmits and receives signals to facilitate a user of the mobile communication device to engage in a communication session with another communication device of a selected one of a plurality of subscribers of interest of the user;
a communication control module coupled to the transmit and receive module, the communication control module receives presence and capability data of the subscribers of interest, receives a request from the user to initiate the communication session, and initiates the communication session with the selected one of the subscribers of interest in a selected manner, based at least in part on the presence and capability data of the selected one of the subscribers of interest, and using the transmit and receive module;
wherein the subscribers of interest are associated with a presence and capability detector that is physically placed at a location and used to monitor the presence and capability of the subscribers of interest at this location; and
wherein the presence and capability detector communicates with identification devices physically proximate to the subscribers of interest via a Personal and/or Local Area Network that is located at this location and independent from the selected manner associated with the communication session.

12. The device of claim 11, wherein said communication control module initiates the communication session by initiating a call to a preferred device of the selected one of the subscribers of interest, if the presence and capability data associated with the selected one of the subscribers of interest indicates presence and capability unknown or uncertain for the selected one of the subscribers of interest.

13. The device of claim 11, wherein said communication control module initiates the communication session by initiating a call to a device of the selected one of the subscribers of interest, located at a home, an office, or a conference room of the selected one of the subscribers of interest, if the presence data associated with the selected one of the subscribers of interest indicates presence at the home, the office or the conference room of the selected one of the subscribers of interest, respectively.

14. The device of claim 11, wherein said communication control module initiates the communication session by initiating a call to a device of the selected one of the subscribers of interest, corresponding to the capability data associated with the selected one of the subscribers of interest.

15. The device of claim 11, wherein said communication control module performs said initiating by requesting a communication service provider to establish the communication session with the subscriber of interest, with the communication service provider establishing the communication session to a device of the selected one of the subscribers of interest, based at least in part on the presence and capability data associated with the selected one of the subscribers of interest.

16. The device of claim 11, wherein said communication control module performs said initiating in response to said receiving of a request to initiate a communication session, without or substantially without receiving further input from the initiating user about the other communication device.

17. The device of claim 11, wherein said communication control module receives the presence and capability data from a proximally disposed presence and capability detector, or from a remotely disposed presence and capability data server.

18. The device of claim 11, wherein the transmit and receive module transmits an identification of the user or the communication device, and capability of the communication device to a proximally located presence and capability detector.

19. The device of claim 11, wherein the communication control module determines a current presence and capability of the selected one of the subscribers of interest, based at least in part on the received presence and capability data of the subscribers of interest.

20. A method comprising:
detecting by a detector located in an area, presence and determining communication capability of a subscriber in the area via at least one Personal and/or Local Area Network in the area; and
directly or indirectly reporting the detected presence and determined communication capability, by the detector, to a communication device of a user having interest in the subscriber, to enable the user to initiate a communication session with the subscriber in a selected manner, based at least in part on the report presence and capability of the subscriber, wherein the at least one Personal and/or Local Area Network is associated with the area and independent from the selected manner associated with the communication session.

21. The method of claim 20, wherein said detecting comprises receiving an identification of the subscriber or an identification of a device associated with the subscriber.

22. The method of claim 21, wherein said receiving comprises receiving from a communication device or an identification device associated with the subscriber.

23. The method claim 21, wherein said receiving comprises receiving from a radio frequency identification (RFID) device.

24. The method of claim 21, wherein said receiving comprises receiving from a communication device, and the method further comprises either the detector transmitting one or more discovery packets to trigger the communication device to respond with the received identification and capability, or the detector transmitting a response to one or more discovery packets transmitted by the communication device, resulting in the communication device providing the identification and capability.

25. The method of claim 20, wherein said reporting comprises transmitting the detected presence and capability to the communication device directly, or indirectly via a server.

26. The method of claim 25, wherein said transmitting is either performed substantially in real time on detection of the presence and capability, or performed in batch with detected presence and capabilities of other subscribers.

27. An apparatus comprising:
- a transmit and receive module that transmits and receives signals; and
- a detection module coupled to the transmit and receive module (1) to detect presence of a subscriber in an area covered by the apparatus and determine communication capability of the subscriber area via at least one Personal and Local Area Network in the area, and (2) to directly or indirectly report the detected presence and/or capability to a communication device of a user having interest in the subscriber, to enable the user to initiate a communication session with the subscriber in a selected manner, based at least in part on the reported presence and capability of the subscriber;
- wherein the detection module is physically placed in the area, and used to monitor the presence and capability of the subscribers of interest in this area; and
- wherein the detection module communicates with an identification device physically proximate to the subscriber via the Personal and/or Local Area Network that is independent from the selected manner associated with the communication session.

28. The apparatus of claim 27, wherein the detection module receives an identification of the subscriber or an identification and capability of a device associated with the subscriber.

29. The apparatus of claim 28, wherein the detection module receives the identification from a communication device or an identification device associated with the subscriber.

30. The apparatus claim 29, wherein the detection module receives the identification from a RFID device.

31. The apparatus of claim 29, wherein the detection module receives the identification from a communication device, and the detection module either further transmits one or more discovery packets to trigger the communication device to respond with the received identification and capability, or further transmits a response to one or more discovery packets transmitted by the communication device, resulting in the communication device providing the identification and capability.

32. The apparatus of claim 27, wherein the detection module transmits the detected presence and capability to the communication device directly, or indirectly via a server.

33. The apparatus of claim 32, wherein the detection module performs said transmitting either substantially in real time on detection of the presence and capability, or in batch with detected presence and capabilities of other subscribers.

34. The apparatus of claim 27, wherein the apparatus is either a desk handset, a base station of a cordless phone, a set-top box, a media control center, or an access point.

* * * * *